United States Patent [19]

Kaltschmidt

[11] Patent Number: 5,109,446

[45] Date of Patent: Apr. 28, 1992

[54] OPTO-ELECTRONIC CORRELATOR INCLUDING A SPIRAL LIGHT WAVEGUIDE

[75] Inventor: Horst Kaltschmidt, Neubiberg, Fed. Rep. of Germany

[73] Assignee: Messerschmitt-Bölkow-Blohm GmbH, Munich, Fed. Rep. of Germany

[21] Appl. No.: 626,269

[22] Filed: Dec. 12, 1990

[30] Foreign Application Priority Data

Dec. 12, 1989 [DE] Fed. Rep. of Germany ....... 3940988

[51] Int. Cl.$^5$ ................................................ G02B 6/10
[52] U.S. Cl. .................................... 385/24; 385/39; 385/48; 385/132
[58] Field of Search ............... 350/96.10, 96.11, 96.12, 350/96.13, 96.15, 96.16, 96.18, 96.20, 96.29

[56] References Cited

U.S. PATENT DOCUMENTS

| | | | |
|---|---|---|---|
| 3,406,358 | 10/1968 | Seidel et al. | 350/96.12 X |
| 3,743,962 | 7/1973 | Rosenberg | 350/96.12 X |
| 4,068,952 | 1/1978 | Erbert et al. | 350/96.16 X |
| 4,918,373 | 4/1990 | Newberg | 350/96.29 X |
| 4,984,863 | 1/1991 | Parriaux et al. | 350/96.11 |

*Primary Examiner*—John D. Lee
*Attorney, Agent, or Firm*—Kenyon & Kenyon

[57] ABSTRACT

A device for recognizing useful signals, transmitted over a distance and comprising noisy electromagnetic, light signals containing information. A tapped delay line is used for this purpose, whereby a waveguide is manufactured in a spiral groove of a wafer using microtechnology, in order to form a planar light waveguide coil on a chip.

12 Claims, 2 Drawing Sheets

OPTO-ELECTRONIC CORRELATOR INCLUDING A SPIRAL LIGHT WAVEGUIDE

BACKGROUND OF THE INVENTION

The present invention relates to an opto-electronic correlator, and particularly to an opto-electronic correlator with a large time-bandwidth product. Previously known correlators or so-called optimum filters or SAW filters (compare DE 32 48 539 C2) have relatively low time-bandwidth products. The ability to detect signals from noise is determined from the quotient of signal energy (power × time) and spectral interference power density; the ability to extract information, such as propagation delay, is determined from the time-bandwidth product of a signal.

SUMMARY OF THE INVENTION

An object of the present invention is to improve the time-bandwidth product of correlators or of optimum filters.

The above and other objects of the invention are achieved by a device for recognizing information signals, transmitted over a distance and comprising noisy electromagnetic, particularly light signals containing information, according to the type of a tapped delay line, wherein a waveguide is manufactured in spiral grooves of a wafer using microtechnology, in order to form a planar light waveguide coil on a chip.

The most important advantage is an increase in the time-bandwidth product by at least one order of magnitude and, accordingly, an increased capability for detecting signals in spite of signals that are very noisy. These advantages apply both with respect to SAW filters (this type of filter is described, for example, in DE 32 48 539 C2) as well as with respect to tapped delay lines (as described for example in EP 0 105 505 A2). The electronic evaluation of the preferred application of the invention (binary correlator) can be made in a manner described in German Patent 38 16 845 C2.

BRIEF DESCRIPTION OF THE DRAWINGS

The invention will be described in greater detail in the following detailed description with reference to the drawings, in which.

DETAILED DESCRIPTION

The invention proposes modulating a signal, which is to be correlated/optimally filtered, upon a light signal of the same temporal length (for example by means of amplitude modulation). In this manner, an opto-electronically effective optimum filter with a very large time-bandwidth product is able to be manufactured according to the model of the tapped-delay-line filter. The light signal modulated in this manner is fed into an optical waveguide. When low damping capacity is required, the optical waveguide is developed, taking into consideration its considerable length, as a glass fiber (the type of glass is selected from the standpoint of optimally low damping capacity). This (single-mode) glass fiber is, for example, pressed into grooves/V-slots (see FIG. 1a) on the silicon wafer, which are advantageously etched out in a spiral form, in order to form a planar coil [acting] as a delay line on a chip. See FIG. 1. This planar light waveguide coil in spiral form is the processed (polished, etched) at discrete locations on the light waveguide, as shown, e.g., at a through f, so that light emerges at these tapped locations. The light emerging out of the outlet windows produced in this manner can now be collected using a lens configuration or a similar optical system and concentrated on a single PIN diode as a photoreceiver; to collect and form the respective correlation and convolution integrals.

Figure 1:
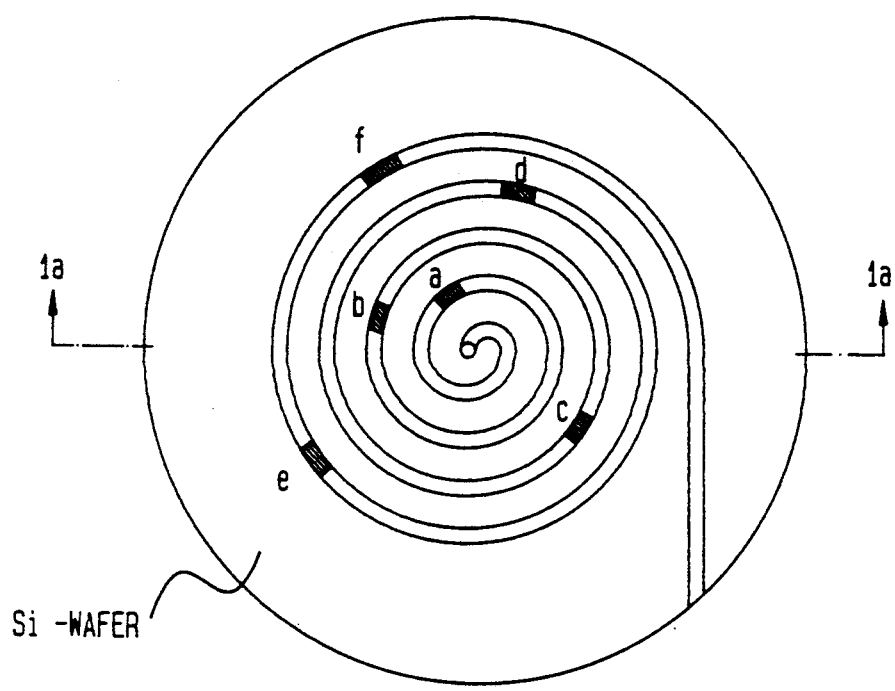
FIG. 1 shows a delay line spiral light waveguide coil disposed on a chip in accordance with the invention.
Figure 1A:
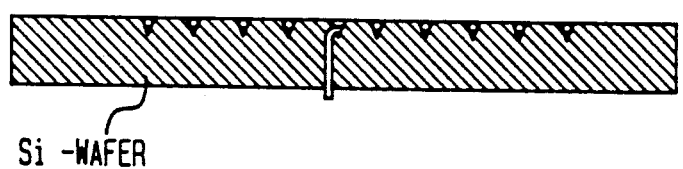
FIG. 1a is a cross-sectional side view of the wafer chip shown in FIG. 1.
Figure 2:
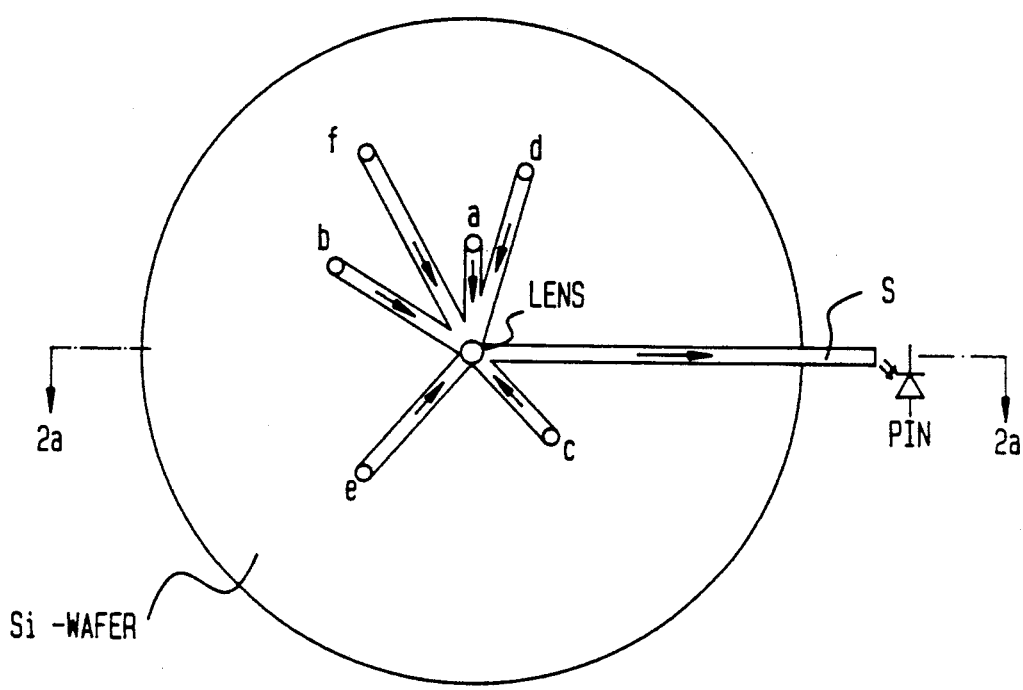
FIG. 2 shows an example of placement of light waveguides for collecting light from tapping windows of the optical spiral waveguide.
Figure 2A:
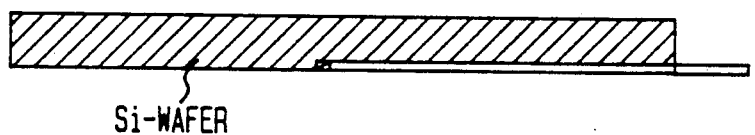
FIG. 2a shows a cross section through the wafer of FIG. 2.
Figure 3:
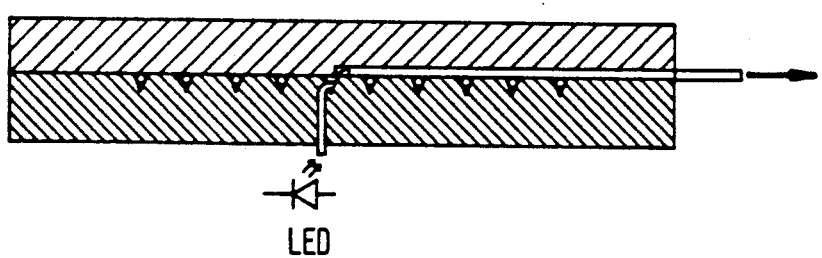
FIG. 3 shows the spiral waveguide of FIG. 1 combined with the additional waveguides disposed on the wafer of FIG. 2, forming the complete opto-electronic correlator according to the invention.

For this purpose, the invention proposes placing tapping points a to f at the outlet windows for the light on an optical waveguide spiral, which originates with a center in FIG. 1 and FIG. 1a and serves as a delay line for light from a pulsed light source (LED), according to FIG. 1. Due to their short length, these collecting light waveguides from a to f, which lead as radial rays to the center and are made of optically conductive material, such as lithium-niobate (LiNbO$_3$), are manufactured in the ray/band pattern using the thin-layer method. The ray pattern is produced with the help of the photomask method or using lithographic means. The collecting light waveguides, which (see FIG. 2 and FIG. 2a) lead from the windows a to f to the center, are arranged on a separate silicon wafer (see FIG. 2a). Also preferably arranged in the center is a convergent lens, which leads together with a collecting light waveguide to the collecting Point S and, from there, to the photoreceiver (PIN diode).

The supporting material for the planar light waveguide coil used as a delay line (FIG. 1a) serves as a base, and the supporting material for the ray-shaped collecting light waveguide (FIG. 2a) serves as the upper part of a combined unit, which will be particularly joined/bonded to the periphery of the two silicon wafers. The light waveguide in the form of a planar, spiral coil is thereby clamped into a spiral of the base (FIG. 1a) manufactured accordingly using microtechnology. Therefore, no adhesive agent (glue) is needed to affix this spiral light waveguide to the base.

According to the invention, collecting light waveguides, particularly in the form of short rods, are vapor-deposited as rays, particularly in a banded form, from optically conductive material, such as lithium-niobate using the thin-layer method/photomask method in a vacuum (PVD or CVD method). In this connection, one uses optimally thin light waveguides and retains optimally thin segments between the V-slots in the silicon wafer (FIG. 1a), in order to realize an optimally long light waveguide on a small space in a planar fashion. Above all, the spiral form is particularly suited for this. It is able to be manufactured quite efficiently using microtechnology, particularly microsystem technology, from a silicon wafer of the above mentioned material in a circular disk form, as is customary in semiconductor technology.

If light is sent through the spiral, it becomes apparent that the correlation peak occurs when, on the spiral light waveguide, all bright sections of light signals lie with the bright/dark sections, which are sent through the light waveguide, at the tapping points (a to f). At this moment, a maximum, that is the highest light intensity is present and is recognizable at the collecting point S with the help of the photoreceiver (PIN diode). The photoelectric detector (PIN diode) thereby momentarily detects the maximum intensity of the optical pulses and accordingly electrical signals are formed. These electrical signals are either analog signals or, after conversion in an analog-digital converter, digital signals (bits) used for further information processing and evaluation.

For this purpose, a processing of binary signals according to DE 38 16 845 C2 may be used, whereby a fast transformation from the 0-state to the 1-state is provided at a rate greater than 1MHz (period = 1 usec) with processing in less than a millisecond. Using electronics and well-known techniques, the converted/-demodulated measuring signals are compared to reference signals for evaluation purposes.

The invention is not limited to the above mentioned exemplified embodiments.

The application of the invention lies above all in the area of radar communication engineering, first of all for transmitting signals over a certain distance using electromagnetic, particularly optical paths, but the invention also finds application in the area of metrology, analytical methods and other applications.

Within the scope of the invention, at signal periods of greater than one microsecond and with real-time processing, carried out in less than one millisecond, of signals of a higher bandwidth up into the gigahertz range, a high time bandwidth product can be attained. The time bandwidth product is the product of the signal duration by the spectral bandwidth of the signal. A high bandwidth of a signal can be achieved by the modulating a sinusoidal signal for example by the on-off modulation. In the case of the invention, the time bandwidth product, which can be processed in real time, lies in the order of magnitude of 1000 and more (a non-dimensional number as an index of the ability of information extraction). If slight alterations are made, however, the shortest connections, which are obtained with the light collecting configuration according to the invention, from the tapping points to the center of a spiral must not be endangered. In other words, one must not jeopardize the goals of the invention, such as short paths, low damping capacity of the light waveguides and excellent capability for extracting modulated/coded information.

Slight alterations can be made with respect to the wafer material, however silicon (Si) was selected due to the good etching capability (anisotropic) of a crystalline material. Other known materials and manufacturing methods are applicable here such as those known from microsystem technology, micromechanics, microelectronics, and optoelectronics, including those used for light waveguides (in thin-layer technology) and their integration, including optics and electronics, onto a chip.

Since the evaluation electronics only includes known circuitry parts such as demodulators A/D- and/or D/A-converters and comparators (for comparison with a reference), it is not described for reasons of simplicity.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A device for recognizing information signals, transmitted over a distance, the information signals including noisy electromagnetic light signals, comprising:
   a wafer having a spiral groove in a surface thereof;
   a tapped delay line, the delay line including a planar light waveguide disposed in the spiral groove of the wafer, the planar light waveguide further having a plurality of taps at discrete locations for emitting light therefrom;
   support material disposed at the surface of the wafer that contains the spiral groove; and
   a secondary light waveguide associated with each tap of the plurality of taps, with the secondary light waveguides being supported by the support material.

2. The device recited in claim 1, wherein the planar light waveguide includes glass fibers disposed in the groove, and the wafer includes a silicon wafer.

3. The device recited in claim 2, wherein the device further includes a photoreceiver for collecting the light emitted at the discrete locations.

4. The device recited in claim 3, wherein the secondary light waveguides guide light to the photoreceiver.

5. The device recited in claim 4, wherein the secondary light waveguides constitute the shortest connection paths from the tap locations to the spiral center or to a collecting point at which the photoreceiver is disposed.

6. The device recited in claim 5, wherein the wafer and the support material are joined to form a single unit.

7. The device recited in claim 4, wherein the secondary light waveguides comprise bands of thin layers of optical conductors.

8. The device recited in claim 7, wherein the optical conductors comprise lithium-niobate ($LiNbO_3$) vapor-deposited in a vacuum.

9. The device recited in claim 1, wherein the taps are formed mechanically.

10. The device recited in claim 1, wherein the taps are formed chemically.

11. A device for recognizing information signals, transmitted over a distance, the information signals including noisy electromagnetic light signals, comprising:
    a silicon wafer for forming a base, the wafer having a tapped delay line that includes a planar light waveguide disposed in a surface thereof and in the form of a spiral groove, the light waveguide having taps at discrete locations for emitting light;
    a photoreceiver for collecting the light emitted at the discrete locations;
    a plurality of secondary light waveguides disposed in s separate supporting material for collecting the light from the taps at discrete locations and guiding the light to the photoreceiver, the supporting material with the secondary light waveguides being placed adjacent the base, and with the supporting material forming an upper part of the single unit structure.

12. A method for recognizing information signals, transmitted over a distance, the information signals including noisy, modulated, electromagnetic light signals, comprising the steps of:

supplying the information signals to a planar spiral delay line waveguide disposed in a surface of a wafer, tapping the waveguide at discrete locations, associating a support material, which has a plurality of secondary light waveguides disposed therein with a surface of the wafer with the delay line waveguide disposed therein, the secondary light waveguides for collecting light emitted from the tapped locations of the delay line waveguide with the light collection being at a common point, and processing the collected light in real time.

* * * * *

UNITED STATES PATENT AND TRADEMARK OFFICE
CERTIFICATE OF CORRECTION

PATENT NO. : 5,109,446
DATED : APRIL 28, 1992
INVENTOR(S) : HORST KALTSCHMIDT

It is certified that error appears in the above-identified patent and that said Letters Patent is hereby corrected as shown below:

COLUMN 2, LINE 10, change "...spiral form is the" to
--...spiral form is then--

COLUMN 4, LINE 58, CLAIM 11, change "s separate supporting material..." to --a separate supporting material...--

Signed and Sealed this

Seventh Day of September, 1993

Attest:

BRUCE LEHMAN

Attesting Officer

Commissioner of Patents and Trademarks